(12) United States Patent
Mielenz

(10) Patent No.: US 8,675,449 B2
(45) Date of Patent: Mar. 18, 2014

(54) ULTRASOUND SENSOR HAVING BLOCKAGE DETECTION

(75) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 13/090,414

(22) Filed: Apr. 20, 2011

(65) Prior Publication Data

US 2012/0020188 A1 Jan. 26, 2012

(30) Foreign Application Priority Data

Apr. 21, 2010 (DE) .......................... 10 2010 028 009

(51) Int. Cl.
*B06B 1/06* (2006.01)

(52) U.S. Cl.
USPC ............................................ 367/99; 367/140

(58) Field of Classification Search
USPC ................................................... 367/99, 140
See application file for complete search history.

(56) References Cited

U.S. PATENT DOCUMENTS

| | | | | |
|---|---|---|---|---|
| 4,972,381 A | * | 11/1990 | Mitchell et al. | ................. 367/13 |
| 5,844,471 A | | 12/1998 | Daniel | |
| 7,156,551 B2 | * | 1/2007 | Ramamurthy et al. | ....... 374/119 |
| 2004/0211240 A1 | * | 10/2004 | Gessert et al. | ................. 73/1.82 |

FOREIGN PATENT DOCUMENTS

| | | |
|---|---|---|
| CN | 201072444 | 6/2008 |
| DE | 37 19 146 | 12/1988 |
| DE | 10 2005 045 019 | 3/2007 |
| JP | 2-41951 | 2/1990 |
| JP | 6-59024 | 3/1994 |
| JP | 2000-35324 | 2/2000 |

* cited by examiner

*Primary Examiner* — Mark Hellner
(74) *Attorney, Agent, or Firm* — Kenyon & Kenyon LLP

(57) ABSTRACT

An ultrasound sensor for distance detection includes a transducer external surface and a blockage sensor provided on the transducer external surface. The surface of the blockage sensor terminates flush with the transducer external surface and is sensitive to an electrical characteristic or is sensitive to a temperature present at the blockage sensor surface. In this way, the blockage sensor can determine whether the ultrasound transducer is blocked by a layer of ice or whether the sensor is free of blockage.

10 Claims, 1 Drawing Sheet

ULTRASOUND SENSOR HAVING BLOCKAGE DETECTION

BACKGROUND OF THE INVENTION

1. Field of the Invention

The present invention relates to an ultrasound sensor for distance recognition for use in vehicles, and in particular to an ultrasound sensor having integrated blockage detection.

2. Description of Related Art

For driver assistance systems, in the area of motor vehicle technology ultrasound-based sensors are used that make use of a pulse-echo method to detect the object, or the environment surrounding the vehicle, on the basis of the reflected ultrasound pulse.

Because the associated ultrasound transducer is necessarily situated on the outside of the vehicle, problem situations occur as a result of weather conditions. If the externally situated transducer is covered by ice, snow, or other solid materials, no echo signal is detected, and the evaluation concludes that the surrounding space is free of objects.

In driver assistance systems that do not provide active support, this can cause accidents if the driver of the vehicle relies on this information. Driver assistance systems that provide active support determine the direction of travel and, if warranted, the speed of travel by themselves, so that a false estimation based on the above-named sensor errors can have serious consequences. The use of such sensor systems in, particularly, driver assistance systems providing active support therefore requires a high degree of reliability.

A sensor test involving active triggering before the beginning of travel is not practicable for a number of reasons.

Standard sensors known from the prior art do not guarantee this reliability, because in the presence of blockages, for example by slush, such sensors will not recognize an ultrasound pulse reflected by an object, and will also falsely assume that an ultrasound pulse was radiated even though the blockage means that only a small part of the energy, if any, was radiated to the surrounding environment.

An object of the present invention is therefore to provide an ultrasound sensor and a method by which the reliability of the sensors is significantly increased, in particular by recognizing such a blockage or blindness of the sensor.

BRIEF SUMMARY OF THE INVENTION

The underlying concept of the present invention is to make an inference based on the state of a surface on or close to the external surface of the transducer of the sensor, and thus to detect a blockage of the transducer external surface. Because the material causing a blockage is typically present not only on the transducer of the sensor itself, but also covers surrounding surfaces, from the presence of material on or next to the transducer external surface it can be concluded that the transducer external surface is also at least partly covered, and therefore blocked. A blockage sensor surface of a blockage sensor can therefore be situated on the transducer external surface or at the transducer external surface, i.e. on the edge or on a part of the edge of the transducer external surface, or, in particular in specific embodiments, on the transducer external surface or on a part of the transducer external surface.

According to the present invention, the blockage, or the material that is hindering the transducer external surface with regard to acoustic radiation (and sensitivity) is recognized on the basis of an electrical characteristic or on the basis of the temperature or thermal radiation or on the basis of optical characteristics, in particular an (optical) absorption characteristic that is characteristic for the blockage material.

The electrical characteristic is, in particular, the dielectricity or permittivity, for example in the form of the dielectric constant or relative permittivity or permittivity constant. The blockage sensor surface forms a capacitor whose capacitance is a function of the materials present there; the capacitance can be queried by applying an alternating voltage or alternating current, the capacitance resulting from the acquired current or voltage. In other words, the alternating current impedance of the blockage sensor (i.e., the alternating current impedance of the material on the blockage sensor surface) is queried.

Another possibility according to the present invention is to query, as an electrical characteristic, the direct current impedance of the blockage sensor, i.e. the direct current impedance of the material present on the surface of the blockage sensor. With the surface of the blockage sensor, the material forms an ohmic resistance that can be queried by applying a voltage or a current (alternating signal or direct signal), the electrical resistance or electrical conductance value resulting from the acquired current or voltage.

The examples given above of the acquisition of the electrical characteristic relate to the acquisition of the specific resistance or of the permittivity of the material present on the surface of the blockage sensor. What is acquired is the material-specific impedance, i.e. the real part thereof (as ohmic resistance) or the imaginary part thereof (permittivity); in general, the complex impedance can also be acquired, because this is generally determined by the material. In the blockage-free state, air is present at the blockage sensor, which has a different electrical characteristic than does material present on the transducer external surface when there is a blockage. As an electrical characteristic, the impedance is acquired, or the real part thereof (ohmic resistance) or the imaginary part thereof or the complex impedance as such is acquired (i.e., dielectric constant as the imaginary part of the impedance or as complex impedance). The material is in particular snow, slush, ice, or a mixture thereof. In particular, on the basis of the electrical characteristic it can be detected whether water, or water having portions of ice, or ice, or snow, is present, in order to detect solid components that have a significant influence on the acoustic characteristics of the transducer when they are present on the transducer external surface.

The blockage, or the material hindering the transducer external surface with regard to acoustic radiation (and sensitivity), can further be recognized on the basis of temperature, or on the basis of a temperature difference or temperature gradient.

The ultrasound sensor or the transducer is used in particular to acquire the surrounding environment in a pulse-echo method, in which the ultrasound sensor is to be situated on an external side of a vehicle. The ultrasound sensor is oriented toward the open surrounding environment. Its range is more than 1 meter, or more than 2 meters in the open surrounding environment. The ultrasound sensor is set up to be situated on an external side of the vehicle (typically on vehicle trim or on a bumper of a motor vehicle) in order to detect objects in the environment surrounding the vehicle. In addition, the ultrasound sensor is set up to indicate the distance to one or more objects in the environment around the vehicle, the ultrasound sensor typically having a pronounced directional characteristic, and a plurality of ultrasound sensors according to the present invention typically being situated on an external side of the vehicle.

The present invention relates to an ultrasound sensor that is set up for distance detection. The ultrasound sensor includes a transducer external surface, a blockage sensor being provided on this transducer external surface that has a blockage sensor surface on the transducer external surface. The blockage sensor is sensitive to an electrical characteristic or is sensitive to a temperature present at the blockage sensor surface. The blockage sensor is set up to measure the electrical characteristic or the temperature and to emit it as a signal that reproduces the electrical characteristic or the temperature.

The transducer external surface is integrated with the blockage sensor surface; in particular, both surfaces are integrated in a housing, for example the housing of the ultrasound sensor. The blockage sensor is also situated in the housing. In this way, a compact constructive design is achieved that is similar to the design of standard distance sensors, so that the sensor according to the present invention can be made compatible with standard sensors. Preferably, the surface of the blockage sensor terminates flush with the transducer external surface.

According to an embodiment that, as described above, is oriented toward acquisition of impedance, the blockage sensor is fashioned as a capacitance sensor that is set up to acquire dielectric characteristics present at the blockage sensor surface. Alternatively, or in combination therewith, the blockage sensor is fashioned as a resistance sensor set up to acquire the electrical resistance present at the blockage sensor surface. The sensor, fashioned as a capacitance sensor or resistance sensor, has at least one electrode that extends on an outer edge of the transducer external surface and extends along the entire circumference, or a part of the circumference, of the transducer external surface. The electrical characteristics are provided either by ambient air at the transducer external surface or by material on the transducer external surface that blocks the ultrasound transducer. The acquisition of the electrical properties can be implemented easily, i.e. by applying a corresponding current of a voltage and acquiring the associated voltage that results for the applied current, or by acquiring the associated current resulting for the applied voltage. In order to acquire the resistance, alternating or direct currents or voltages may be used, and alternating currents or voltages may be used to acquire the capacitive properties (dielectric properties).

In a preferred specific embodiment, the blockage sensor, fashioned as a capacitance sensor or resistance sensor, has two electrodes that extend concentrically on the outer edge of the transducer external surface, in particular around the entire circumference, or that are situated on different sides of the transducer external surface. The shape of the electrodes (or electrode) follows the shape of the edge of the transducer external surface with a constant radial distance. Given a circular transducer external surface, electrodes (at least one electrode) having a circular shape are used. In this specific embodiment, the at least one electrode is situated on the edge of the transducer external surface.

A further specific embodiment provides that at least one electrode extends on the transducer external surface of the ultrasound sensor. Here, the blockage sensor, fashioned as a capacitance sensor or resistance sensor, has an electrode.

The at least one electrode can extend concentrically on the outer edge of the transducer external surface, in particular around the entire circumference, or is situated on one side of the transducer external surface. As another alternative, the at least one electrode extends on the transducer external surface. One of the electrodes can be provided as a counterelectrode. This counterelectrode is formed by a conductive component of a transducer of the ultrasound sensor, the transducer providing the transducer external surface. The transducer can be provided by a piezoelement that includes a metal plate and a thin metal layer situated opposite, between which piezoelectrically active material is provided. The metal plate and/or the metal layer can provide the at least one electrode or a counterelectrode.

If the blockage sensor acquires a capacitance as an electrical characteristic (capacitive sensor), the at least one electrode (or at least two electrodes) can be provided on the edge of the transducer external surface or on the transducer external surface. If an electrode, or a plurality of electrodes, is provided on the transducer external surface, these can be covered with an additional insulating layer, for example a coat of lacquer. The at least one electrode is made of electrically conductive material, i.e. a metal or some other electrically conductive material. In particular if the electrodes are not covered with a coat of lacquer, the electrodes are made of a material that is substantially transparent to the visible light spectrum, for example indium tin oxide doped with tin(IV) oxide (ITO), SnO2:F (tin(IV) oxide doped with fluorine, FTO), ZnO:Al (zinc oxide doped with aluminum, AZO), or SnO2:Sb (tin(IV) oxide doped with antimony, ATO). If a covering layer (e.g. a coat of lacquer) is situated on the at least one electrode, the electrical characteristics thereof are then preferably taken into account in the acquisition of the material, for example in the creation or selection of the threshold value.

If the blockage sensor acquires, as electrical characteristic, an electrical resistance (resistive sensor), the at least one electrode (or at least two electrodes) can be provided on the edge of the transducer external surface or on the transducer external surface.

If an electrode, or a plurality of electrodes, are provided on the transducer external surface, these are preferably immediately adjacent (without a further covering layer) to the surrounding environment. The at least one electrode is made of an electrically conductive material, i.e. a metal or some other electrically conductive material. The electrodes can in particular be made of material that is substantially transparent to light in the visible spectrum, for example indium tin oxide doped with tin(IV) oxide (ITO), SnO2:F (tin(IV) oxide doped with fluorine, FTO), ZnO:Al (zinc oxide doped with aluminum, AZO), or SnO2:Sb (tin(IV) oxide doped with antimony, ATO).

If at least one electrode situated on the transducer external surface is used, it can be comb-shaped or meander-shaped. In particular if two electrodes are present on the transducer external surface, these can be interleaved with one another, for example as interleaved combs or meander paths. This enlarges the detection surface of the blockage sensor. The electrodes are not immediately electrically connected to one another.

In a temperature-based specific embodiment, the blockage sensor is fashioned as a temperature sensor set up to acquire the temperature present at the blockage sensor surface. The temperature sensor is situated laterally next to the blockage sensor surface, or is situated under this surface. The temperature sensor is connected to the transducer external surface so as to conduct heat, or is at least capable of acquiring the temperature immediately adjacent to the transducer external surface. The temperature sensor can be fashioned as a semiconductor element, an NTC or PTC temperature sensor, a Peltier element, or a Seebeck element, or can make use of a further temperature acquisition device that converts a temperature into an electrical signal. In particular, the temperature sensor can acquire a temperature difference, for example if it is fashioned as a thermopile or as a Seebeck element (or also as a Peltier element). The (at least) two points of the temperature sensor at which temperature is acquired are then situated at different points on the transducer, for example both on the transducer external surface or at a point on the transducer external surface and at another point situated (laterally) outside the transducer external surface. Instead of situating the temperature-sensitive points at these locations, these locations can also be connected in thermally conductive fashion to the relevant points.

The present invention is further realized by a detection device having an ultrasound sensor that comprises a blockage sensor according to the present invention, fashioned as a temperature sensor. The detection device is set up to detect a blocking coating on the transducer external surface. The detection device has a temperature interface for connection to an additional temperature sensor. Alternatively, the detection device can include a further temperature sensor of this sort connected to the detection device. The further temperature sensor of the detection device, or the further temperature sensor connectable thereto, is situated at a point remote from the transducer external surface. The detection device includes a difference circuit that is set up to provide a difference between the temperature acquired by the transducer at the transducer external surface or a point immediately adjacent thereto and the temperature acquired by the further transducer, as a difference result. The further temperature sensor acquires the ambient temperature, but at a different point, preferably a protected point, and provides a reference temperature. If the temperature at the transducer external surface differs from the reference temperature (in its level or its temporal curve), then it can be determined that the transducer external surface has a coating (for example a coating of ice) that falsifies the (protected) acquisition of the external temperature. On the basis of this determination, the presence of the coating that is acoustically blocking the ultrasound sensor can be inferred.

In addition, the present invention is realized by a method for detecting a blockage on a transducer external surface of an ultrasound sensor provided for distance detection. An electrical characteristic or a temperature at a blockage sensor surface of a blockage sensor is acquired by this sensor. The blockage sensor surface is provided on the transducer external surface. On the basis of the electrical characteristic or the temperature at the blockage sensor surface, according to the method a blockage of the transducer external surface by blockage material having the electrical characteristic or temperature is inferred. Thus, from the electrical characteristic or temperature present at (or on) the transducer external surface, or in the immediate vicinity thereof, the presence is inferred of material that is acoustically blocking the ultrasound sensor.

A specific embodiment of the method provides that the electrical characteristic is acquired in the form of a capacitance or in the form of an electrical resistance (in general: electrical impedance). A blockage is assumed if the capacitance is greater than a prespecified capacitance threshold value. Alternatively, a blockage is assumed if the electrical resistance is smaller than a prespecified resistance threshold value. The threshold values correspond to a blockage-free blockage sensor surface, i.e. a blockage sensor surface or transducer external surface that is immediately adjacent to ambient air. A blockage signal is provided or displayed if a blockage is to be assumed on the basis of the acquired information. The blockage signal is produced by an evaluation circuit or by a signal generator.

An alternative specific embodiment of the method provides that the temperature is acquired at the blockage sensor surface (using a temperature sensor on, under, or in the immediate vicinity of the transducer external surface). Preferably, in addition a further temperature is acquired, as an ambient temperature or reference temperature, at a point remote from the transducer external surface. This variant, which provides the temperature acquisition at least two different points (at least one of which is on the transducer external surface), corresponds to the acquisition as temperature difference. The presence of a blockage is assumed if the temperature at the blockage sensor surface differs from the additional temperature by more than a prespecified temperature difference value. In addition, the presence of a blockage is assumed if the temporal curve of the temperature on the blockage sensor surface differs from the temporal curve of the additional temperature (i.e. reference temperature). A blockage signal is provided or displayed when the presence of a blockage is to be assumed on the basis of the acquisition of the temperatures or of the temperature difference. By using the temperature difference instead of a single temperature at the transducer external surface, a blockage-free situation with temperatures (significantly) below the freezing point of water can be distinguished from a situation in which the transducer external surface is covered with a layer of ice (or the like) and therefore has a temperature differing from the ambient temperature (acquired in the absence of ice). The protected ambient temperature, therefore acquired in the absence of blockage, is used as a reference temperature. The reference temperature can be protected by a projection or protected in some other way, after open space in the surrounding environment is acquired using a reference temperature sensor having a sensor point that is so protected. According to an alternative specific embodiment, only the temperature curve at the transducer external surface is acquired and is compared to a prespecified temperature curve, preferably a prespecified temperature curve specified in accordance with acquired driving conditions (e.g., vehicle speed=0 or >0). If the vehicle speed is >0, temperature curves having temperatures varying over time should occur as a result of the airstream if the transducer is free of blockage; therefore, if for example a vehicle speed >0 is acquired and the acquired temperature is essentially constant (or shows a maximum rate of change that is smaller than a prespecified least rate typical for driving operation), then the presence of blockage by ice or the like (i.e., the presence of a disturbance) can be assumed.

The specific embodiments based on temperature measurement may use passive temperature measurement or active temperature measurement. In the case of active temperature measurement, an infrared source is used, and its radiation is acquired after diffusion on the transducer surface and is evaluated according to prespecified typical values. In addition, a heat source can be provided that is in thermally conductive contact with the transducer external surface. If a heat sensor situated close to the heat source heats up with a high temperature increase when the heat source is activated, a blockage-free state is to be assumed, while if the increase is below a prespecified typical temperature increase rate the presence of a coating of ice or slush may be assumed. If a blockage is detected, the heat source can be activated in order to heat the transducer surface significantly above 0° C. and to melt the coating.

Further specific embodiments relate to an optical scanning, either passive or active. In particular, an optical sensor (on the transducer external surface or oriented thereto) can be used to acquire the spectrum and to compare it to a typical spectrum. Because ice or slush has a characteristic frequency-selective scattering of light, in particular frequency-selective (i.e. wavelength-selective) filters can be used to estimate the spectrum. In addition, the light intensity can be evaluated. In the case of passive optical scanning, preferably two optical sensors are used, one of which is set up to acquire the transducer external surface (or a point situated close thereto); another one is situated further away for reference. If there are differences between the acquired sensor values greater than a prespecified difference, blockage of the transducer external surface is inferred. In the case of active optical acquisition, a light source is used to radiate light onto or in the vicinity of the transducer external surface, and the light reflected or transmitted on the transducer external surface or in the vicinity thereof is acquired by a light receiver situated on or in the vicinity of the transducer external surface, and is evaluated. The evaluation can relate to the intensity or to the spectrum; if the spectrum is evaluated, a frequency-selective (i.e. wavelength-selective) filter may be used. In order to suppress disturbing influences, the radiated light can be modulated; in this case, the receiver can distinguish the modulated light from other light. Likewise, a filtering at the receiver is possible if the radiated light has a particular wavelength; here, the filtering can be adapted to this wavelength and can block other wavelengths.

DETAILED DESCRIPTION OF THE INVENTION

Figure 1:
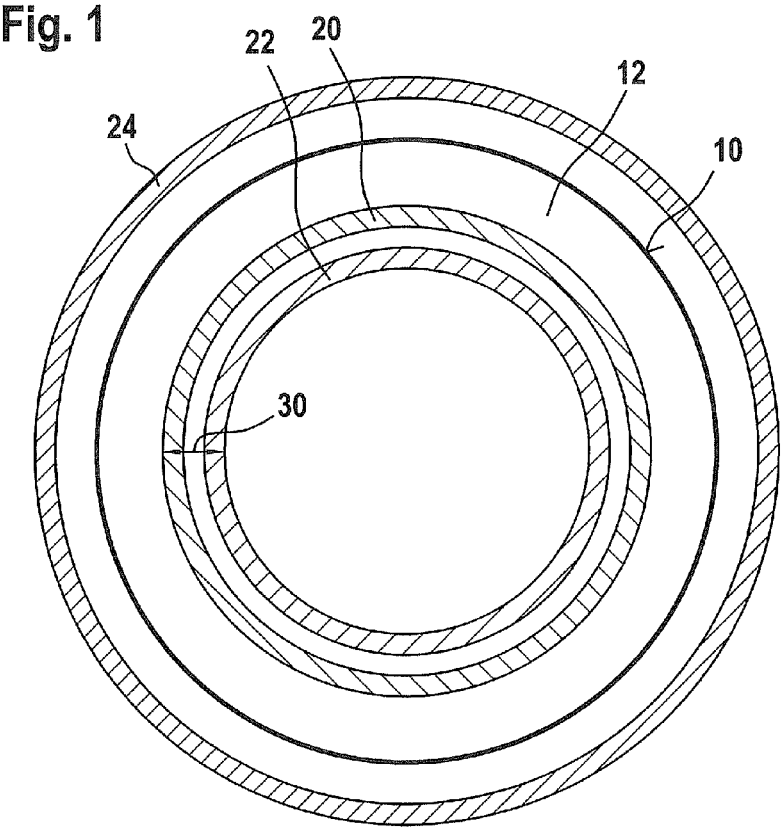
FIG. 1 shows a top view of an ultrasound sensor according to the present invention.

FIG. 1 shows an ultrasound sensor 10 according to the present invention having a transducer external surface 12 and a blockage sensor 20, 22. Two concentrically situated circular electrodes 20, 22, which form the blockage sensor, are situated in circular transducer external surface 12. Electrodes 20, 22 are fashioned as conductor tracks, each electrode having an electrical terminal (not shown), for example also in the form of a conductor track. Electrodes 20, 22 are covered by a non-conductive protective layer (not shown). The electrodes themselves, and the surface between the electrodes, form a blockage sensor surface 30 that is annular, in accordance with the shape of electrodes 20, 22. Electrodes 20, 22, and thus blockage sensor surface 30, are integrated in transducer external surface 12, and, using an electrical alternating field, acquire the capacitive characteristics of the space that extends over the plane of the drawing (i.e. over electrodes 20, 22), from the transducer external surface (and from the transducers).

The electrodes form a capacitive blockage sensor, together if warranted with an excitation circuit (not shown) that produces the electrical alternating field over electrodes 20, 22, and, if warranted, together with an evaluation circuit (not shown) that evaluates the current or the voltage between electrodes 20, 22. Such an evaluation circuit can for example include an analog threshold value element that determines whether or not an acquired signal exceeds a prespecified threshold value. An evaluation circuit (i.e. the threshold value element), as well as the excitation circuit (e.g. an alternating signal generator, in particular a flip-flop), can be integrated with the ultrasound transducer, i.e. can be housed in the same housing as the ultrasound transducer.

Electrode 24 is situated outside the lateral edge of transducer external surface 10 (shown by a thick line) and surrounds it concentrically. The distance between electrode 24, which is situated essentially in the same plane as transducer external surface 10, and the lateral edge of transducer external surface 10 is typically a few millimeters, preferably less than 2, 1, 0.5, or 0.1 mm. Electrode 24 can be situated on a bearer or on a housing segment in which the transducer is also provided. Electrode 24 surrounds transducer external surface 10 around its entire circumference. In an alternative specific embodiment (not shown), electrode 24 can have two parts, i.e. can be interrupted at two points, thus forming two electrode pieces insulated from one another, each used as an electrode. In addition, in an alternative specific embodiment (not shown), electrodes 24 can have two parts, in the form of two concentric rings insulated from one another electrically that form an electrode pair. In the specific embodiment shown in FIG. 1, electrode 24 is used as one electrode of an electrode pair, a metal surface of the transducer (forming a component, e.g. an excitation electrode of the transducer) forming the other electrode of the electrode pair.

A specific embodiment that is the best way to realize the present invention is shown in the variant shown in FIG. 1, in which electrode 24 and a metal surface (as a functional component of the transducer) are used as electrodes, and the edge of the metal surface oriented toward electrode 24 is used as a counterelectrode, the edge of the metal surface corresponding to the outer edge of transducer external surface 12 or running concentrically thereto inside transducer external surface 12, and the electrodes being evaluated by capacitive acquisition. Alternatively, another metal component of the vehicle may be used as a counterelectrode to electrode 24.

Figure 2:
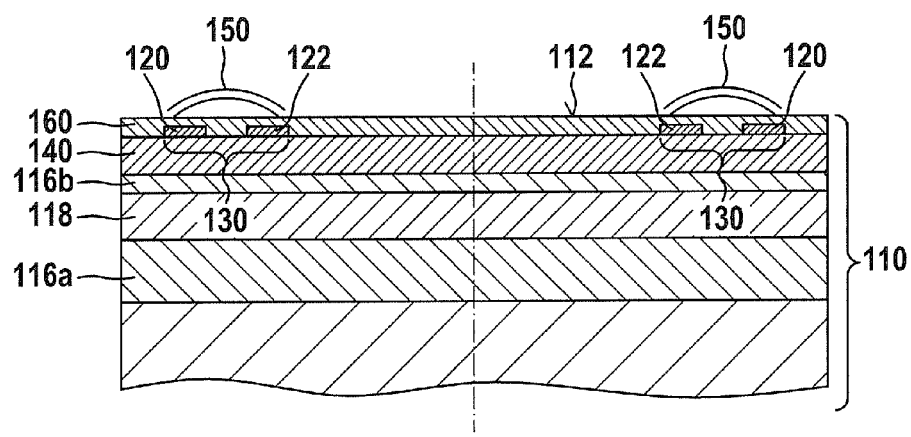
FIG. 2 shows a sectional view of the ultrasound sensor shown in FIG. 1.

FIG. 2 shows the ultrasound sensor of FIG. 1 in a sectional view. The reference characters in FIG. 2 correspond to the reference characters in FIG. 1, with a prefixed numeral 1. Ultrasound sensor 110 shown in FIG. 2 [has] a transducer external surface 120 for radiating and receiving ultrasound waves. Ultrasound sensor 110 includes an ultrasound transducer 114 having two flat transducer electrodes 116a, b, between which there is provided a layer 118 of piezoelectrically active material. Transducer electrodes 116a, b produce an electrical field that causes layer 118 to undergo a contraction when an ultrasound pulse is transmitted. During reception, electrodes 116a, b produce a signal in accordance with the received ultrasound waves. Above the upper, outward-oriented transducer electrode 116b, there is provided an insulating layer 140 that electrically separates transducer electrode 116b from electrodes 120, 122 (of the blockage sensor) situated above it. Between electrodes 120, 122 (of the blockage sensor), an electrical alternating field 150 is excited whose disturbance by a blocking layer situated over it (not shown) is detected according to the present invention. A protective layer 160, e.g. a coat of lacquer, is situated on insulating layer 140 and on electrodes 120, 122 (of the blockage sensor). Protective layer 160 is non-conductive and preferably has a low electrical dielectric constant, for example <20 or <10 or <5, so that it will not deform field 150. In addition, protective layer 160 is made thin, preferably thinner than 1 mm or thinner than 200 µm.

In this way, electrodes 120, 122 define a blockage sensor range 130 that is oriented away from transducer 110 and extends into the space above protective layer 160. The spatial orientation of blockage sensor range 130 is defined by the course of field lines 150.

The electrical characteristics, in particular in the fashioning of the ultrasound sensor according to the present invention as a capacitive sensor, are acquired on the basis of the rise times of the electrode signal of electrodes 120, 122 (or of some other electrode pair), in particular during excitation with a rectangular signal. Alternatively, the maximum amplitude value or a rectified signal of electrodes 120, 122 (or of some other electrode pair) is used for the evaluation. Long rise times mean a high capacitance through electrodes 120, 122 (or some other electrode pair), so that rise times that are above a threshold value indicate the presence of a coating. For the excitation, signals are preferably used whose frequency corresponds to a frequency at which ice has a high dielectric constant. Due to the polar nature of ice, these are relatively low frequencies, <100 kHz or <20 kHz. In addition, a layer of water can be distinguished from a coating of ice due to their different dielectric constants, or due to the different ways in which the respective dielectric constant is a function of the frequency. For example, a point, or a plurality of points, of the Cole-Cole diagram can be acquired and compared to target values for ice or for water. In this way, at least two frequencies used for excitation can be used for evaluation, in order to enable a coating of water to be distinguished from a coating of ice. Threshold values used for the evaluation are preferably based on the values that would be expected given the presence of a coating of ice. Water coatings may be considered as a blockage-free situation, especially since these are usually not continuous, and are relatively thin.

In FIG. 2, the layer thicknesses are not shown to scale; in particular, the thickness of layers 120, 122, and 160 is thin (less than 500 μm, or less than 100 μm), in order to avoid impairing the electrical or acoustic excitation of the ultrasound transducer. In addition, these layers are preferably made of materials that are elastic and that do not impair the production or reception of sound.

In a specific embodiment that is not shown, the protective layer does not extend over the entire external surface of the transducer, but rather only over the blockage sensor surface, or also covers only the electrodes (but covers these completely, including if warranted a narrow edge that extends laterally from the electrodes). Due to the circular shape of the electrodes, they do not distort the produced (or received) acoustic signal, because during excitation of the ultrasound transducer waves (likewise circular) propagate in a circular fashion from the center out, and this propagation is carried along with the same shape by the concentric circular electrodes.

What is claimed is:

1. An ultrasound sensor configured for distance detection, comprising:
   a transducer external surface; and
   a blockage sensor provided on the transducer external surface, the blockage sensor having an annular blockage sensor surface on the transducer external surface, wherein the blockage sensor is sensitive to one of (i) an electrical property or (ii) a temperature that is present at the blockage sensor surface.

2. An ultrasound sensor configured for distance detection, comprising:
   a transducer external surface;
   a blockage sensor provided on the transducer external surface, the blockage sensor having a blockage sensor surface on the transducer external surface, wherein the blockage sensor is sensitive to one of (i) an electrical property or (ii) a temperature that is present at the blockage sensor surface; and
   a housing, wherein the blockage sensor is situated in the housing, and wherein the transducer external surface is integrated with the blockage sensor surface.

3. An ultrasound sensor configured for distance detection, comprising:
   a transducer external surface;
   a blockage sensor provided on the transducer external surface, the blockage sensor having a blockage sensor surface on the transducer external surface,
   wherein the blockage sensor is sensitive to one of (i) an electrical property or (ii) a temperature that is present at the blockage sensor surface; and
   at least one electrode which extends one of (i) on a segment of the transducer external surface, or (ii) laterally on an outer edge of the transducer external surface, wherein the transducer external surface is substantially round, and wherein the at least one electrode extends along at least a portion of the circumference of the transducer external surface;
   wherein the blockage sensor is configured as one of a capacitance sensor for acquiring dielectric characteristics present at the blockage sensor surface, or a resistance sensor for determining electrical resistance.

4. The ultrasound sensor as recited in claim 3, wherein the blockage sensor is configured as one of a capacitance sensor or a resistance sensor having two electrodes which are one of (i) situated concentrically to one another and concentrically to the outer edge of the transducer external surface, or (ii) situated laterally at different sides of the transducer external surface.

5. The ultrasound sensor as recited in claim 4, further comprising:
   a counterelectrode formed by a conductive component, wherein the conductive component is situated on the transducer external surface.

6. An ultrasound sensor configured for distance detection, comprising:
   a transducer external surface;
   a blockage sensor provided on the transducer external surface, the blockage sensor having a blockage sensor surface on the transducer external surface, wherein the blockage sensor is sensitive to one of (i) an electrical property or (ii) a temperature that is present at the blockage sensor surface;
   wherein the blockage sensor is configured as a temperature sensor for determining the temperature present at the blockage sensor surface, the temperature sensor being situated one of (i) laterally adjacent to the blockage sensor surface, (ii) under the blockage sensor surface, or (iii) on the blockage sensor surface, and wherein the temperature sensor is connected in thermally conductive fashion to the transducer external surface, and wherein the temperature sensor is configured as one of a semiconductor element, an NTC temperature sensor, a PTC temperature sensor, a Peltier element, a Seebeck element, or a thermopile.

7. A detection device, comprising:
   an ultrasound sensor configured for distance detection, wherein the ultrasound sensor includes: a transducer external surface; and a blockage sensor provided on the transducer external surface, the blockage sensor having a blockage sensor surface on the transducer external surface, wherein the blockage sensor is sensitive to one of (i) an electrical property or (ii) a temperature that is present at the blockage sensor surface;
   a temperature interface configured for connection to a further temperature sensor situated at a point remote from the transducer external surface; and a difference circuit configured to provide a difference value between the temperature acquired by the blockage sensor and the temperature acquired by the further temperature sensor;

wherein the detection device is configured to detect a blockage coating on the transducer external surface.

8. A method for detecting a blockage on a transducer external surface of an ultrasound sensor configured for distance detection, comprising:

determining, by the ultrasound sensor, one of an electrical characteristic or a temperature at an annular blockage sensor surface of a blockage sensor, wherein the annular blockage sensor surface is provided on the transducer external surface in order to infer, on the basis of the electrical characteristic or the temperature at the blockage sensor surface, a blockage of the transducer external surface.

9. The method as recited in claim 8, wherein the electrical characteristic is one of a capacitance or electrical resistance, and wherein the presence of a blockage is determined if one of (i) the capacitance is greater than a predetermined capacitance threshold value corresponding to a blockage sensor surface free of blockage, or (ii) the electrical resistance is smaller than a predetermined resistance threshold value corresponding to the blockage sensor surface free of blockage, and wherein a blockage signal is provided if the presence of a blockage is determined.

10. The method as recited in claim 8, wherein a temperature is determined at the blockage sensor surface, and wherein a further temperature is acquired as an ambient temperature at a point remote from the transducer external surface, the presence of a blockage being determined if one of (i) the temperature at the blockage sensor surface differs from the further temperature by more than a predetermined temperature difference value, or (ii) the temporal curve of the temperature at the blockage sensor surface differs from the temporal curve of the further temperature, and wherein a blockage signal is provided if the presence of a blockage is determined.

* * * * *